(12) United States Patent
Li et al.

(10) Patent No.: US 8,764,311 B2
(45) Date of Patent: Jul. 1, 2014

(54) SINGLE-MODE OPTICAL FIBERS FOR OPTICAL FIBER CONNECTORS

(75) Inventors: Ming-Jun Li, Horseheads, NY (US); Gaozhu Peng, Horseheads, NY (US); Constantine Saravanos, Highland Village, TX (US)

(73) Assignee: Corning Cable Systems LLC, Hickory, NC (US)

( * ) Notice: Subject to any disclaimer, the term of this patent is extended or adjusted under 35 U.S.C. 154(b) by 60 days.

(21) Appl. No.: 13/436,286

(22) Filed: Mar. 30, 2012

(65) Prior Publication Data

US 2013/0259426 A1 Oct. 3, 2013

(51) Int. Cl.
*G02B 6/38* (2006.01)
*G02B 6/02* (2006.01)

(52) U.S. Cl.
USPC ............................................. 385/70; 385/123

(58) Field of Classification Search
USPC ............................................................ 385/70
See application file for complete search history.

(56) References Cited

U.S. PATENT DOCUMENTS

| | | | |
|---|---|---|---|
| 6,885,802 B2 * | 4/2005 | Oliveti et al. | 385/123 |
| 7,455,460 B2 | 11/2008 | Pimpinella et al. | 385/55 |
| 2010/0046899 A1 * | 2/2010 | Bickham et al. | 385/124 |

* cited by examiner

*Primary Examiner* — Omar Rojas (57) ABSTRACT

A single-mode optical fiber for use as a stub fiber in an optical fiber connector is disclosed. The optical fiber is configured minimize the adverse effects of multipath interference (MPI) that can arise in a short, single-mode conventional stub fiber that has a large group index difference. The optical fiber is also configured to have a mode-field diameter that is substantially the same as that of single-mode optical fibers intended for use as field fiber in a mechanical splice connector, along with a cutoff wavelength $\lambda_C \leq 1200$ nm. An optical fiber connector that uses the optical fiber as a stub fiber is also disclosed.

9 Claims, 5 Drawing Sheets

PRIOR ART

FIG. 1

PRIOR ART

FIG. 2

*Prior Art*

SINGLE-MODE OPTICAL FIBERS FOR OPTICAL FIBER CONNECTORS

FIELD

The present disclosure relates to optical fibers and optical fiber connectors, and in particular relates to single-mode optical fibers for optical fiber connectors.

BACKGROUND

Optical fiber connectors are used in a variety of telecommunications applications to connect one optical fiber to another, or to connect an optical fiber to a telecommunications device. Certain optical fiber connectors such as mechanical splice connectors include a short section of single-mode optical fiber (SMF) called a stub fiber that interfaces with a field optical fiber that is inserted into the connector in the field by the end-user. When a connector is operably connected (mated) to another connector, the stub fiber resides between the field fiber of its own connector and the stub fiber of the mating connector.

When all the optical fibers are aligned and otherwise matched in size and configuration, the light travels in the field and stub fibers in the lowest or fundamental mode, namely the $LP_{01}$ mode. However, a misalignment, a mismatch in the mode-field diameter (MFD) of the fibers, or a combination of these and other factors, can cause light to travel in higher-order modes, such as the $LP_{11}$ mode for a short distance even though the fibers are SMFs. Thus, though an optical fiber may be designed to be an SMF, there are circumstances under which they operate as multimode optical fibers.

Coherent light traveling in different guided modes takes different optical paths and can cause multi-path interference (MPI). MPI can cause light transmitted through the connector to have significant time-dependent fluctuations that are exacerbated by the use of off-the-shelf SMFs designed for long-haul telecommunications applications. MPI and the attendant power fluctuations are undesirable and degrade the performance of the telecommunications system in which the optical fiber connector is used.

SUMMARY

Single-mode optical fibers suitable for use in optical fiber connectors as stub fibers are disclosed herein. The single-mode optical fibers have a fundamental mode ($LP_{01}$) that substantially matches the mode field diameter of a standard SMF to reduce or minimize connector loss.

An aspect of the disclosure is a single-mode optical fiber ("fiber") for use in an optical fiber connector having an operating wavelength $\lambda$. The fiber includes a core having a radius $r_0$, with a cladding immediately surrounding the core, with the core and cladding supporting a fundamental mode. The core and cladding define a relative refractive index profile $\Delta$ that defines a cutoff wavelength $\lambda_C \leq 1200$ nm and a mode-field diameter $MFD_{SN}$ that is: a) between 8.2 μm and 9.7 μm when the operating wavelength $\lambda=1310$ nm, and b) between 9.2 μm and 10.9 μm when the operating wavelength $\lambda=1550$ nm.

Another aspect of the disclosure is fiber for use in an optical fiber connector having an operating wavelength $\lambda$. The fiber has a core having a radius $r_0$, with a cladding immediately surrounding the core, wherein the core radius $r_0$ is in the range from 3.5 μm to 5.5 μm. The core and cladding define a relative refractive index profile $\Delta$ that defines a cutoff wavelength $\lambda_C \leq 1200$ nm and that has a maximum relative refractive index $\Delta_0$ in the range from 0.26 to 0.40%. The core and cladding also define a mode-field diameter $MFD_{SN}$ that is: a) between 8.2 μm and 9.7 μm when the operating wavelength $\lambda=1310$ nm, and b) between 9.2 μm and 10.9 μm when the operating wavelength $\lambda=1550$ nm.

Another aspect of the disclosure is an optical fiber connector that utilizes the fiber as disclosed herein as a stub fiber. The connector has a first alignment member that operably supports the stub fiber, with the stub fiber having an end. The connector also includes a second alignment member that operably supports a single-mode field optical fiber such that the respective ends of the stub fiber and the single-mode field optical fiber are operably aligned and interfaced.

These and other aspects of the disclosure will be further understood and appreciated by those skilled in the art by reference to the following specification, claims and appended drawings.

BRIEF DESCRIPTION OF THE DRAWINGS

A more complete understanding of the present disclosure can be had by reference to the following Detailed Description when taken in conjunction with the accompanying drawings, where.

DETAILED DESCRIPTION

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

The claims as set forth below are incorporated into and constitute part of this Detailed Description.

The symbol μm and the word "micron" are used interchangeably herein.

Mode field diameter or MFD is a measure of the spot size or beam width of light propagating in an optical fiber. The MFD is a function of the source wavelength, fiber core radius ($r_0$) and fiber refractive index profile. In an example, the mode field diameter MFD can be measured using the Peterman II method, where MFD=2w, and $$w^2 = 2 \frac{\int_0^\infty E^2 r\, dr}{\int_0^\infty (dE/dr)^2} r\, dr,$$

where E is the electric field distribution in the optical fiber and r is the radial coordinate of the optical fiber. The MFD of a standards-compliant single-mode optical fiber is denoted herein as $MFD_S$, while the MFD of the single-mode optical fiber 100 disclosed below is denoted $MFD_{NS}$.

The term "relative refractive index," as used herein, is defined as:

$$\Delta(r) = [n(r)^2 - n_{REF}^2)]/2n(r)^2,$$

where n(r) is the refractive index at radius r, unless otherwise specified. The relative refractive index is defined at 1550 nm unless otherwise specified. In one aspect, the reference index $n_{REF}$ is silica glass. In another aspect, $n_{REF}$ is the maximum refractive index of the cladding. As used herein, the relative refractive index is represented by Δ and its values are given in units of "%", unless otherwise specified. In cases where the refractive index of a region is less than the reference index $n_{REF}$, the relative refractive index is negative and is referred to as having a depressed region or depressed-index, and the minimum relative refractive index is calculated at the point at which the relative index is most negative unless otherwise specified. In cases where the refractive index of a region is greater than the reference index $n_{REF}$, the relative refractive index is positive and the region can be said to be raised or to have a positive index.

The parameter α (also called the "profile parameter") as used herein relates to the relative refractive index Δ, which is in units of "%," where r is the radius (radial coordinate), and which is defined by:

$$\Delta(r) = \Delta_0 \left[1 - \left(\frac{r - r_m}{r_0 - r_m}\right)^\alpha\right],$$

where $r_m$ is the point where Δ(r) is the maximum $\Delta_0$, $r_0$ is the point at which Δ(r) % is zero, and r is in the range $r_i \le r \le r_f$, where Δ(r) is defined above, $r_i$ is the initial point of the α-profile, $r_f$ is the final point of the α-profile, and α is an exponent which is a real number. For a step index profile, α>10 and for a gradient-index profile, α<5. It is noted here that different forms for the core radius $r_0$ and maximum relative refractive index $\Delta_0$ can be used without affecting the fundamental definition of Δ. The maximum relative refractive index $\Delta_0$ is also called the "core delta," and these terms are used interchangeably herein.

The limits on any ranges cited herein are considered to be inclusive and thus to lie within the range unless otherwise specified.

The term "dopant" as used herein refers to a substance that changes the relative refractive index of glass relative to pure undoped $SiO_2$. One or more other substances that are not dopants may be present in a region of an optical fiber (e.g., the core) having a positive relative refractive index Δ.

The term "mode" is short for a guided mode. A single-mode fiber as the term is used herein means an optical fiber designed to support only a single mode over a substantial length of the optical fiber (e.g., 2 meters or longer) but that under certain circumstances can support multiple modes over short distances (e.g., tens of millimeters, for example a length L≤20 mm). In contrast, a multi-mode optical fiber means an optical fiber designed to support the fundamental mode and at least one higher-order mode over a substantial length of the optical fiber, such as 2 meters or longer.

The cutoff wavelength $\lambda_C$ of a mode is the minimum wavelength beyond which a mode ceases to propagate in the optical fiber. The cutoff wavelength of a single-mode fiber is the minimum wavelength at which an optical fiber will support only one propagating mode, i.e., below the cutoff wavelength, two or more modes can propagate. Typically the highest cutoff wavelength $\lambda_C$ of a multimode optical fiber corresponds to the cutoff wavelength of the $LP_{11}$ mode. A mathematical definition can be found in Single Mode Fiber Optics, Jeunhomme, pp. 39-44, Marcel Dekker, New York, 1990, wherein the theoretical fiber cutoff is described as the wavelength at which the mode propagation constant becomes equal to the plane wave propagation constant in the outer cladding. This theoretical cutoff wavelength is appropriate for an infinitely long, perfectly straight fiber that has no diameter variations. A measured cutoff wavelength $\lambda_C$ is normally lower than the theoretical cutoff wavelength, typically 20 nm to 50 nm lower for a 2 meter fiber with substantially straight deployment.

The operating wavelength λ is the wavelength at which a particular optical fiber operates, with example first and second operating wavelengths being 1310 nm and 1550 nm, which are commonly used in telecommunications systems that include optical fiber connectors of the type disclosed herein.

The phrase "SMF-28e fiber" as used hereinbelow refers to a particular type of standards-compliant single-mode optical fiber made by Corning, Inc., of Corning, N.Y. The term "SMF-28e" is a registered trademark of Corning, Inc.

Figure 1:
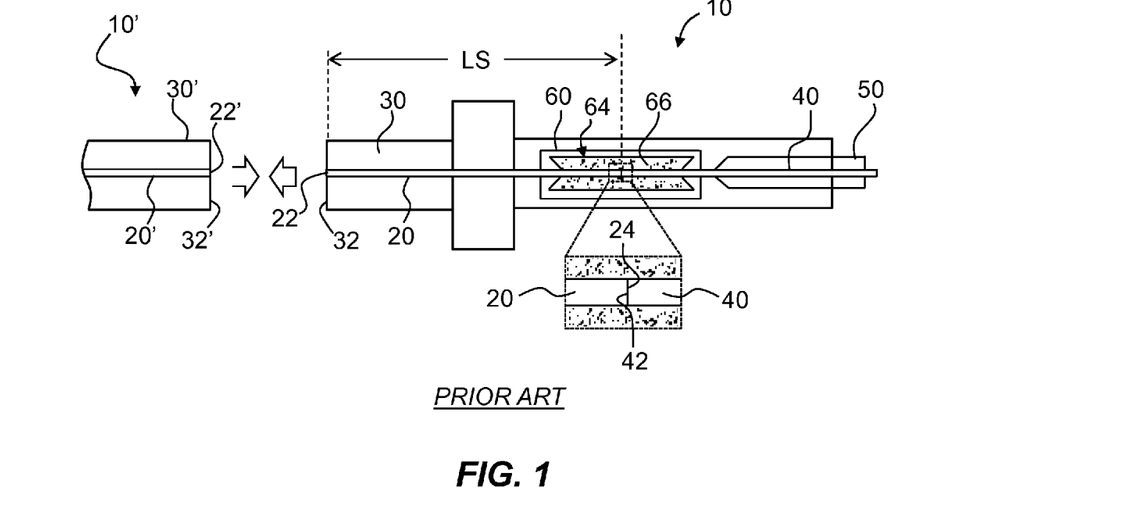
FIG. 1 is a schematic cross-sectional view of an example prior art optical fiber connector that employs a single-mode stub fiber.

FIG. 1 is a schematic cross-sectional diagram of a conventional example optical fiber connector ("connector") 10, which is based generally on the Unicam® optical fiber connector from Corning Cable Systems LLC, of Hickory, N.C. The connector 10 includes a stub fiber 20 that has opposite ends 22 and 24, and that in an example has a length L in the range from 13 mm to 20 mm. The stub fiber 20 is supported by a stub alignment member 30 (e.g., a ferrule), and in an example the stub fiber is secured therein using, for example, an epoxy. The stub alignment member 30 has an end face or tip 32, which is factory polished so that the corresponding stub fiber end 22 is also polished.

The optical fiber connector 10 also includes a single-mode field optical fiber ("field fiber") 40 that has an end 42 and that is operably supported by an alignment member 50, e.g., a ferrule. The stub fiber 20 is optically coupled to field fiber 40 by aligning and interfacing the two fibers at their respective ends 24 and 42. In other words, a mechanical splice is made between the stub fiber and the field fiber. This is accomplished, for example, via a mechanical or fusion splice member 60 that includes an interior 64, which in an example contains an index-matching material (e.g., a gel) 66.

FIG. 1 also shows an end portion of a mating connector 10' configured to mate with connector 10. The mating connector 10' can be a stub-fiber type of connector that includes an alignment member 30' that supports a stub fiber 20' having an end 22' at a straight facet 32'. The mating connector 10' can be also a regular connector built on a fiber jumper.

In prior-art types of connectors 10 as shown in FIG. 1, a standards-compliant (hereinafter, "standard") single-mode optical fiber (SMF) is typically used for stub fiber 20. However, as discussed above, standard SMFs are generally not strictly limited to single-mode operation at the operating wavelengths λ, of 1310 nm or 1550 nm for a short fiber of a few centimeters. Under certain conditions, higher-order modes can propagate in a standard SMF. Thus, in the discussion below, standard SMF fiber 20 is described as having certain attributes of a multimode optical fiber, such as a group index difference $\Delta n_g$.

For standard SMFs of a few meters in length, the higher-order modes are completely attenuated and so are not observed. However, at lengths significantly shorter, such as those associated with stub fiber 20, a standard SMF can carry significant power in the higher-order modes. Moreover, for standard SMFs, the group index difference $\Delta n_g$ between the fundamental mode and the higher-order modes can be exceedingly large. As a consequence, the light traveling in a standard SMF over different optical paths can interfere, giving rise to the aforementioned detrimental MPI.

Figure 2:
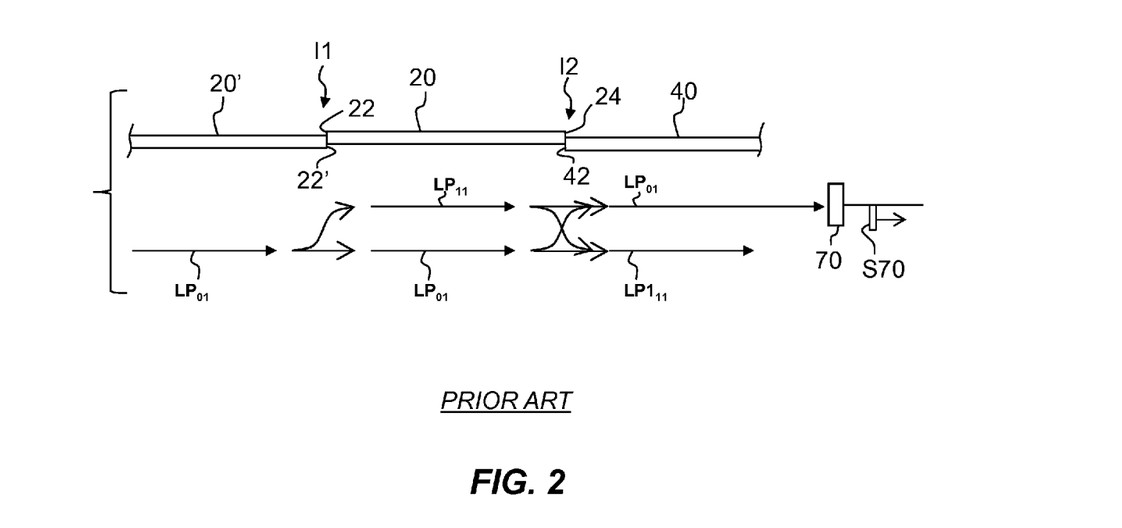
FIG. 2 is a close-up side view of first and second stub fibers and a field fiber in a misaligned configuration that can arise when two optical fiber connectors like those in FIG. 1 are operably mated.

FIG. 2 is a close-up view of stub fiber 20' of connector 10', stub fiber 20 of connector 10, and field fiber 40 of connector 10 in a misaligned configuration that can arise when connectors 10' and 10 of FIG. 1 are mated. The three fibers shown in FIG. 2 are optically coupled at interfaces I1 and I2 (i.e., the mating interfaces between fibers). In this configuration, stub fiber 20' is the launching fiber and field fiber 40 is the receiving fiber. Stub fibers 20 and 20' and field fiber 40 are all standard SMFs.

The optical fibers 20' and 20 are shown as being misaligned (offset) relative to one another at interface I1, while stub and field fibers 20 and 40 are shown as being misaligned relative to one another at interface I2. These misalignments can and do happen in practice.

As shown in the lower half of FIG. 2, the fundamental mode $LP_{01}$ travels in stub fiber 20' of connector 10' toward stub fiber 20. Because stub fibers 20 and 20' are misaligned, the fundamental mode $LP_{01}$ excites a higher-order $LP_{11}$ mode to travel in stub fiber 20, so that now both the fundamental mode $LP_{01}$ and the higher-order mode $LP_{11}$ travel in stub fiber 20. When these two modes encounter the misaligned field fiber 40, the fundamental $LP_{01}$ mode of stub fiber 20 couples mainly to the fundamental $LP_{01}$ mode of field fiber 40. However, some light of the fundamental $LP_{01}$ mode of stub fiber 20 couples to the higher order $LP_{11}$ mode of field fiber 40.

Similarly, the higher order $LP_{11}$ mode of stub fiber 20 couples mainly to the higher order $LP_{11}$ of field fiber 40. Some light of the higher order $LP_{11}$ mode of stub fiber 20 couples also to the fundamental $LP_{01}$ mode of field fiber 40. After propagating a certain length in field fiber 40, the $LP_{11}$ mode gets cut off and only the fundamental $LP_{01}$ mode travels therein. Light from the fundamental $LP_{01}$ mode ultimately gets detected, as shown by a photodetector 70 and a corresponding electrical signal S70. Because the $LP_{01}$ and $LP_{11}$ modes from stub fiber 20 have different phases, the power of the excited $LP_{01}$ mode in field fiber 40 exhibits an oscillation behavior as a function of wavelength due to interference effects. The light associated with the higher order mode $LP_{11}$ is lost.

The standard SMF optical fibers that have been used as stub fibers 20 in conventional connectors 10 have typically been designed to meet the ITU G.652 standards for long-distance transmission in telecommunications systems. However, a stub fiber operates over a decidedly shorter distance and so need not meet this particular standard. On the other hand, the SMF fiber 100 disclosed herein for use as a stub fiber is designed to improve connector performance over conventional stub fibers since they are not tailored for long-distance applications. Consequently, it is not constrained in performance due to limitations associated with off-the-shelf standard SMFs that are not designed for use as stub fibers.

Single-Mode Optical Fiber

An aspect of the disclosure is a SMF fiber that has a cutoff wavelength $\lambda_C < 1200$ nm and a fundamental mode having a mode-field diameter $MFD_{NS}$ that substantially matches the mode field diameter $MFD_S$ of a standard SMF to provide for low connector loss and reduced multiple path interference. (MPI). The SMF fiber disclosed herein can be used in a connector as a stub fiber to reduce insertion loss. In addition, it has the advantage that it can be easily manufactured using existing single-mode fiber production processes.

With reference again to FIG. 2, the amount of optical power transmitted by field fiber 40 depends on the coupling or transmission efficiencies at the two optical fiber interfaces (joints) I1 and I2. The transmission efficiencies are determined by the amount of misalignment (offset) between the two interfacing fibers, their orientation (angle) at the first and second interfaces, and the polarization of light traveling within the fibers. The amount of transmitted optical power also depends on the attenuation of higher-order modes in the fiber over the length of the fiber segment, and the delay between the different modes. A stub fiber can have a length L in the range from 10 mm to 20 mm, with 15 mm to 20 mm being typical.

The transmission efficiency η can be expressed mathematically as:

$$\eta = \eta_{0101}^{(1)} \eta_{0101}^{(2)} + \sum_{l,m} \eta_{01lm}^{(1)} \eta_{lm01}^{(2)} e^{-\alpha_{lm} L} + \qquad (1)$$

$$\sum_{l,m} 2\sqrt{\eta_{0101}^{(1)} \eta_{0101}^{(2)} \eta_{01lm}^{(1)} \eta_{lm01}^{(2)}} \; e^{-\frac{\alpha_{lm}}{2} L} \cos\left(\frac{2\pi \Delta n_{lm} L}{\lambda}\right).$$

In most cases the $LP_{11}$ mode is the dominant higher-order mode, in which case:

$$\eta = \eta_{0101}^{(1)} \eta_{0101}^{(2)} + \eta_{0111}^{(1)} \eta_{1101}^{(2)} e^{-2\alpha_{11} L} + \qquad (2)$$

$$2\sqrt{\eta_{0101}^{(1)} \eta_{0101}^{(2)} \eta_{0111}^{(1)} \eta_{1101}^{(2)}} \; e^{-\frac{\alpha_{11}}{2} L} \cos\left(\frac{2\pi \Delta n_{11} L}{\lambda}\right),$$

where $\eta_{01\,01}^{(1)}$ is the coupling coefficient of the $LP_{01}$ mode from the launching fiber to the stub fiber, $\eta_{01\,01}^{(2)}$ is the coupling coefficient from the stub fiber to the receiving fiber, $\eta_{01\,lm}^{(1)}$ is the coupling coefficient from the $LP_{01}$ mode to a higher-order mode $LP_{lm}$, $\eta_{01\,lm}^{(2)}$ is the coupling coefficient from the $LP_{lm}$ to the $LP_{01}$ mode at the second joint, $\Delta n_{lm}$ is the effective index difference between the $LP_{lm}$ mode and the $LP_{01}$ mode, λ is the operating wavelength of light from a coherent light source (not shown), and $\alpha_{lm}$ is the attenuation coefficient of the $LP_{lm}$ mode and is not to be confused with the α parameter associated with the effective refractive index profile Δ.

From Eq. (2), the transmission efficiency fluctuation can be expressed as:

$$\frac{d\eta}{d\lambda} = \frac{4\pi L}{\lambda^2}\left(\Delta n_{11} - \frac{d\Delta n_{11}}{d\lambda}\right)\sqrt{\eta_{0101}^{(1)} \eta_{0101}^{(2)} \eta_{0111}^{(1)} \eta_{1101}^{(2)}} \; e^{-\frac{\alpha_{11}}{2} L} \sin\left(\frac{2\pi \Delta n_{11} L}{\lambda}\right) \quad (3)$$

$$= \frac{4\pi L}{\lambda^2} \Delta n_{g11} \sqrt{\eta_{0101}^{(1)} \eta_{0101}^{(2)} \eta_{0111}^{(1)} \eta_{1101}^{(2)}} \; e^{-\frac{\alpha_{11}}{2} L} \sin\left(\frac{2\pi \Delta n_{11} L}{\lambda}\right)$$

Figure 3:
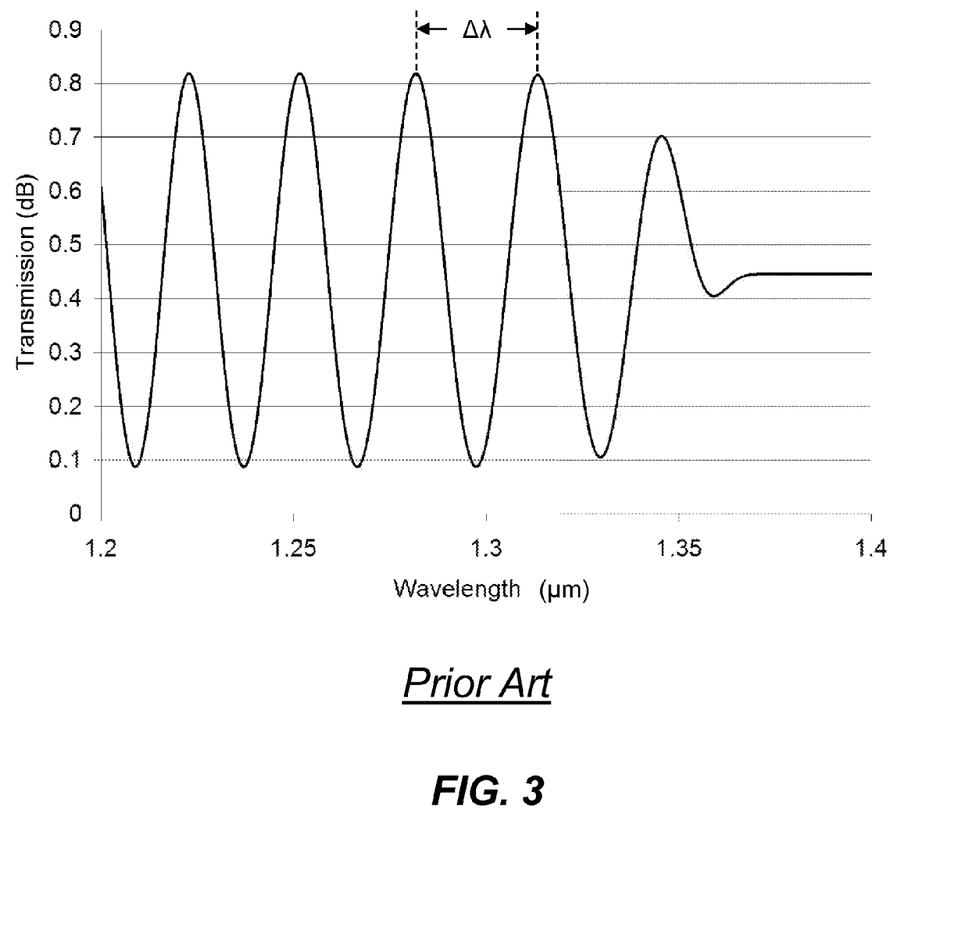
FIG. 3 is a plot of the operating wavelength $\lambda$ (microns) versus transmission (dB) and shows an example transmission efficiency curve for an example conventional stub fiber, with the peak-to-peak wavelength spacing $\Delta\lambda$, of about 32 nm shown in the plot.

FIG. 3 is a plot of operating λ wavelength (microns) versus transmission (dB) and shows an example transmission efficiency of an example conventional stub fiber, with the peak-to-peak wavelength spacing Δλ of about 32 nm as shown in the plot. From Eq. (3), the peak-to-peak wavelength spacing (i.e., the transmission fluctuation wavelength spacing) can be obtained by the relationship:

$$\Delta\lambda = \lambda^2/(\Delta n_{g11} L), \quad (4)$$

where $\Delta n_{g11}$ is the group index difference for the $LP_{11}$ mode versus the $LP_{01}$ mode and L is the length of the optical fiber. As a reference, for a stub fiber made of SMF-28e fiber, with a group index difference $\Delta n_{g11} = 0.004$, an operating wavelength $\lambda = 1310$ nm and a length L=13.3 mm yields the transmission fluctuation wavelength spacing $\Delta\lambda$ of about 32 nm as shown in the plot (for L=15 mm, $\Delta\lambda$ is about 29 nm). This transmission fluctuation wavelength spacing $\Delta\lambda$ is relative short and translates into a high probability of MPI occurring over the length of the stub fiber.

Equations (3) and (4) show that there are three main factors that affect the fluctuation in the transmission efficiency: the loss of higher-order modes, the group index difference $\Delta n_g$ and the coupling coefficients $\eta$ at the fiber interfaces. Particularly the transmission fluctuation can be reduced by increasing the loss of the higher-order modes, while optimizing the coupling coefficients. One way to increase the loss of the higher order modes is to reduce the cutoff wavelength $\lambda_C$ of fiber.

Figure 4:
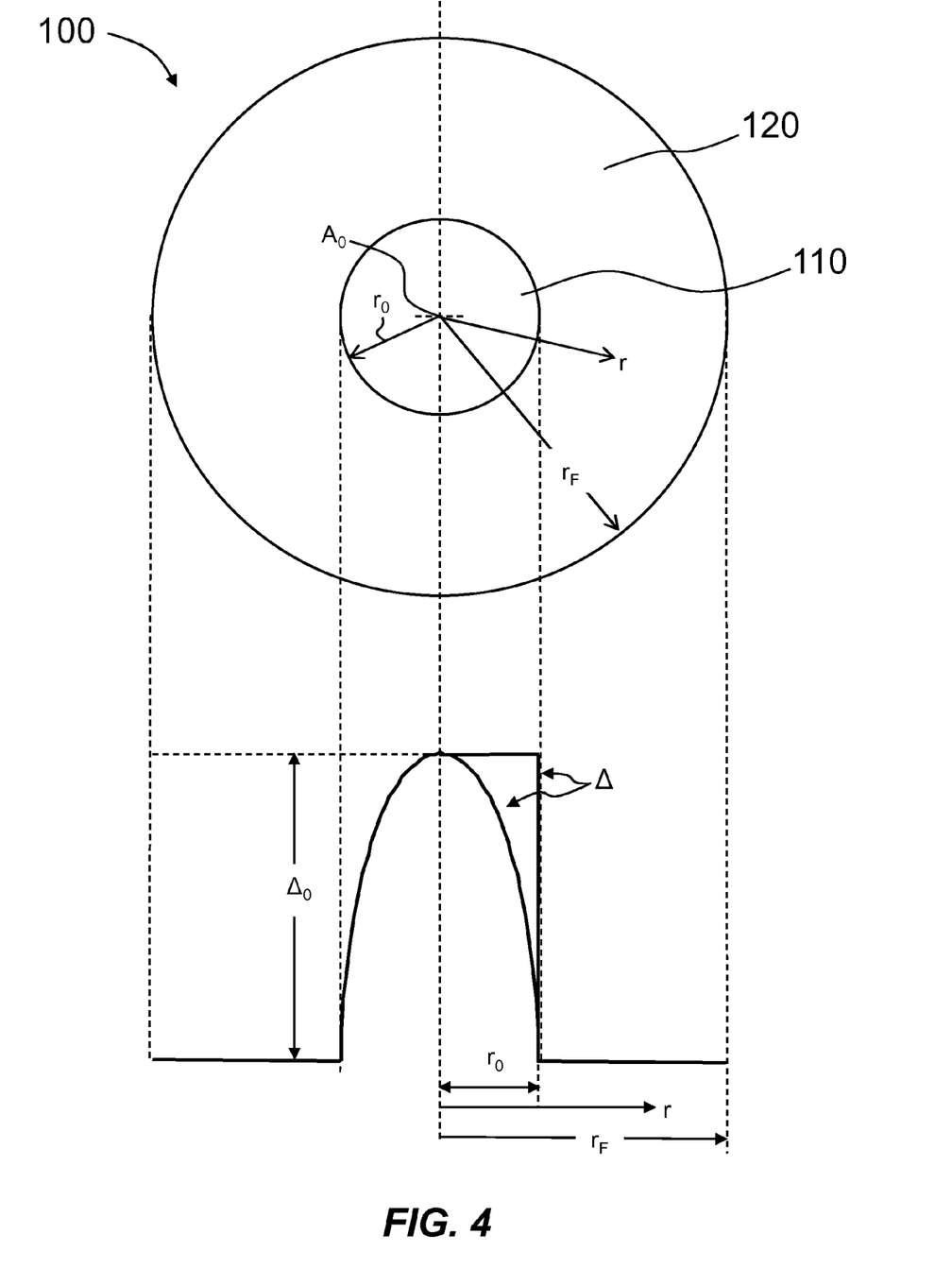
FIG. 4 shows a cross-sectional view of an exemplary single-mode optical fiber according to the disclosure, along with two exemplary idealized relative refractive index profiles $\Delta$.

FIG. 4 is a cross-sectional view of an exemplary SMF fiber ("fiber") 100 according to the disclosure. Fiber 100 has a core region ("core") 110 having a radius $r_0$ and a cladding region ("cladding") 120 immediately surrounding the core. In an example, core 110 comprises pure silica glass ($SiO_2$) or silica glass with one or more dopants. The dopants act to increases the relative refractive index $\Delta$ in a gradient-index fashion, though they can be used to form a substantially step-like index profile. In an ideal case, the relative refractive index has a maximum $\Delta_0$ at r=0, i.e., on an optical fiber central axis $A_0$, and that monotically decreases to a value $\Delta = 0$ at $r = r_0$. Suitable dopants include $GeO_2$, $Al_2O_3$, $P_2O_5$, $TiO_2$, $ZrO_2$, $Nb_2O_5$, and $Ta_2O_5$, as well as combinations thereof. An example cladding 120 has single layer with a uniform (i.e., constant) relative refractive index $\Delta = 0$ out to the cladding outer radius $r_F$.

FIG. 4 also includes two idealized example profiles for the relative refractive index $\Delta$, namely a step-index (or step-like) profile and a parabolic profile. The relative refractive index $\Delta$ is sometimes called an "alpha profile" in the case where it can be described by the aforementioned $\alpha$ parameter. In practice, the actual relative refractive index profile can differ from the idealized profile due to the particularities of the manufacturing process. Examples of actual (measured) relative refractive index profiles $\Delta$ are introduced and shown below in connection with FIG. 5.

The fiber 100 disclosed herein has a relatively low cutoff wavelength $\lambda_C$ for reducing MPI, while the MFD is substantially matched to standard SMFs typically used in connectors. Thus, in one exemplary embodiment, the key relative refractive index profile parameters ($\Delta_0$, $\alpha$, $r_0$) are selected to achieve a cutoff wavelength $\lambda_C \leq 1200$, while in another exemplary embodiment, $\lambda_C \leq 1160$ nm.

Standard SMFs have relative refractive index profiles optimized to meet ITU G.562 standards and have a cable cutoff wavelength of $\lambda_{CC} = 1260$ nm, which corresponds to a fiber cutoff $\lambda_C$ of about 1320 nm, an $MFD_S = 9.2$ μm±0.5 μm, and a zero dispersion wavelength between 1300 and 1324 nm. These limitations do not allow for MPI to be substantially reduced, so that the use of standard SMFs in an optical fiber connector adversely affects connector performance.

Fiber 100 disclosed herein has a relatively low cutoff wavelength $\lambda_C \leq 1200$ nm and an $MFD_{NS}$ that is about the same as the $MFD_S$ for a standard SMF, wherein $MFD_S$ is 9.2 μm±0.5 μm at $\lambda = 1310$ nm and 10.4 um±0.5 μm at $\lambda = 1550$ nm.

In an exemplary embodiment, the relative refractive index profile parameters $\Delta_0$, $\alpha$ and $r_0$ are selected so that fiber 100 has the reduced the cutoff wavelength $\lambda_C \leq 1200$ nm and $MFD_{NS} \approx MFD_S$. Table 1 below sets forth six design examples EX1 through EX6 of fiber 100. In the examples, the core delta (i.e., $\Delta_0$) ranges from 0.28% to 0.39%, the core radius $r_0$ ranges from 3.85 μm to 5.1 μm, and $\alpha$ ranges from 2 to 200. EX1 to EX5 have substantially step-like relative refractive index profiles and EX6 is a substantially parabolic index profile.

In an exemplary embodiment of fiber 100, the core delta ($\Delta_0$) can be in the range from 0.26% to 0.40%, and the core radius $r_0$ can be in the range from 3.5 μm to 5.5 μm.

For all of the examples EX1 through EX6, the theoretical cutoff wavelength $\lambda_C$ is below 1200 nm. It is noted here that the measured cutoff wavelength $\lambda_C$ of an optical fiber is usually lower than the theoretical cutoff value.

The $MFD_{NS}$ at $\lambda = 1310$ nm ranges from 8.7 μm to 9.7 μm and the $MFD_{SN}$ at $\lambda = 1550$ nm ranges from 10.1 μm to 11.3 μm, which general matches the $MFD_S$ of standard SMFs. In an example embodiment of fiber 100, the $MFD_{SN}$ is in the range from 8.2 μm and 9.7 μm when the operating wavelength $\lambda = 1310$ nm and is in the range from 9.2 μm to 10.9 μm when the operating wavelength $\lambda = 1550$ nm.

TABLE 1

Design Examples for SMFs 100

|  | EX1 | EX2 | EX3 | EX4 | EX5 | EX6 |
|---|---|---|---|---|---|---|
| $\Delta_0$ | 0.32 | 0.35 | 0.28 | 0.318 | 0.325 | 0.39 |
| $r_0$ (μm) | 4.06 | 3.85 | 4.25 | 4 | 4.3 | 5.1 |
| $\alpha$ | 20 | 20 | 20 | 200 | 10 | 2 |
| Cutoff (nm) | 1164 | 1155 | 1140 | 1194 | 1185 | 1159 |
| $MFD_{NS}$ @ 1310 nm | 9.1 | 8.7 | 9.7 | 9.2 | 9.1 | 9 |
| $MFD_{NS}$ @ 1550 nm | 10.6 | 10.1 | 11.3 | 10.6 | 10.6 | 10.6 |

Table 2 below sets forth data for six different exemplary fibers 100 (denoted F1 through F6) that were fabricated using the outside vapor deposition process and standard optical fiber draw techniques. The core 110 is silica doped with $GeO_2$ and the cladding 120 is pure silica. The fiber diameter of the example fibers 100 is denoted $D_C$, wherein $D_C = 2r_F$. The corresponding measured refractive index profiles $\Delta$ are plotted in FIG. 5, along with an ideal step-like profile and an ideal parabolic profile. The measured cutoff wavelengths and MFDs for exemplary fibers F1 through F6 are well within the design parameter ranges.

Figure 5:
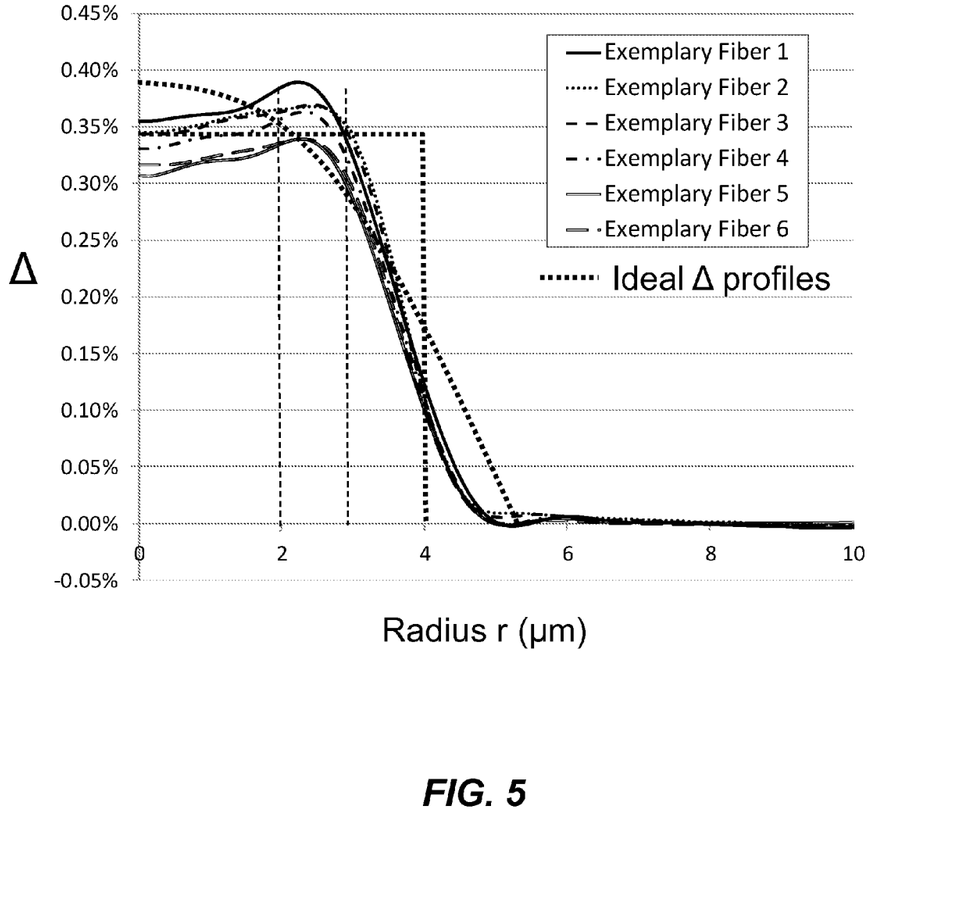
FIG. 5 is a plot of the relative refractive index profile $\Delta$ as a function of radius r for six design examples EX1 through EX6 of the example single-mode optical fiber according to the disclosure, along with the two example ideal profiles of FIG. 4.

The measured (actual) profiles in FIG. 5 are substantially step-like profiles in that they deviate slightly from an ideal step-like profile. This is due to $GeO_2$ diffusion towards the center of the fiber during the central hole collapse process used in making the preform, and $GeO_2$ diffusion towards the cladding when making the preform and during the fiber draw process. In addition, draw-induced stress can also change the profile shape. However, the profile deviations do not substantially affect the properties and light-guiding characteristics of fiber 100, with the core delta ($\Delta_0$) and the core radius $r_0$ staying within the design targets.

In an exemplary embodiment, the core delta ($\Delta_0$) can be located at a core radius $r_0$ in the range from 2 μm to 3 μm, while in other exemplary embodiments where the profile is more ideal, the core delta ($\Delta_0$) is located substantially at $r_0=0$.

TABLE 2

Measured parameters for fabricated SMFs 100

|    | $D_C$ (μm) | Measured $\lambda_C$ (nm) | $MFD_S$ @1310 (μm) | $MFD_S$ @1550 (μm) |
|----|------------|---------------------------|---------------------|---------------------|
| F1 | 125 | 1131 | 8.68 | 10.04 |
| F2 | 125 | 1123 | 8.71 | 10.07 |
| F3 | 125 | 1114 | 8.74 | 10.17 |
| F4 | 125 | 1086 | 8.80 | 10.45 |
| F5 | 125 | 1042 | 9.10 | 10.67 |
| F6 | 125 | 1037 | 9.02 | 10.50 |

Figure 6:
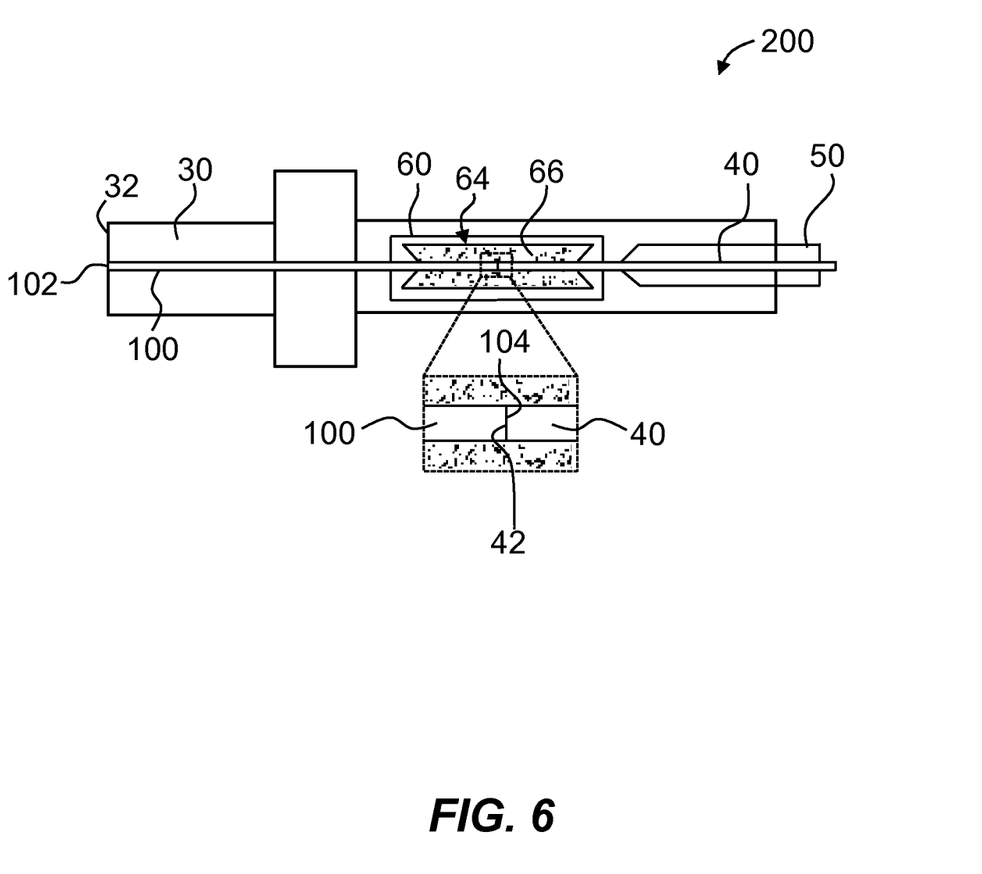
FIG. 6 is similar to FIG. 1 and schematically shows an exemplary optical fiber connector that uses the optical fiber of the present disclosure as the stub fiber.

FIG. 6 is similar to FIG. 1 and shows an example embodiment of a connector 200 similar to connector 10, but that includes fiber 100 with opposite ends 102 and 104 serving as the single-mode stub fiber. As discussed above, the use of fiber 100 as the stub fiber in a connector reduces the adverse effects of MPI.

To test the performance of fiber 100 in a connector such as connector 200 of FIG. 6, a total of 400 connectors were assembled using two fibers 100 with cutoff wavelengths $\lambda_C$ of 1178 nm and 1100 nm, respectively. Table 3 below summarizes the test results. For comparison purposes, typical test results for connectors using SMF28e fiber with cutoff wavelength $\lambda_C$ of 1221 nm are also listed in Table 3, along with the data for the connectors that employ the two fibers 100 (denoted #1 and #2).

TABLE 3

Connector Test Results

| Stub fiber type | | SMF28e | Fiber 100 #1 | Fiber 100 #2 |
|---|---|---|---|---|
| Measured $\lambda_C$ (nm) | | 1221 | 1178 | 1100 |
| IL (dB) | 1310 nm | 0.30 | 0.26 | 0.29 |
|  | 1550 nm | 0.27 | 0.22 | 0.26 |
| MPI (dB) | 1310 nm | 0.26 | 0.17 | 0.11 |
|  | 1550 nm | 0.07 | 0.09 | 0.07 |
| RL (dB) | 1310 nm |  | 50 |  |
|  | 1550 nm |  | 50 |  |

The insertion losses (IL) and return losses (RL) for the two connector made from fibers 100 are similar to those of SMF28e. However, the MPI at 1310 nm is significantly reduced for the connectors made from the two fibers 100 as compared with the connectors made with SMF28e. In an exemplary embodiment, fiber 100 provides the connector with an amount of MPI that is at least 2× smaller (as measured in dB at 1310 nm) than a connector that employs a standard SMF.

It will be apparent to those skilled in the art that various modifications to the preferred embodiment of the disclosure as described herein can be made without departing from the spirit or scope of the disclosure as defined in the appended claims. Thus, the disclosure covers the modifications and variations provided they come within the scope of the appended claims and the equivalents thereto.

What is claimed is:

1. An optical fiber connector for use at an operating wavelength, comprising:
    a single-mode optical fiber having the operating wavelength λ which generally defines single-mode operation of the single-mode optical fiber for lengths greater than 2 meters, the single-mode optical fiber having a length L in the range from 10 mm to 20 mm over which multiple modes at the operating wavelength λ are supported, the single-mode optical fiber comprising a core of radius $r_0$, and a cladding immediately surrounding the core, wherein the core and cladding: support multiple modes at the operating wavelength λ for the length L define a relative refractive index profile Δ that is either substantially parabolic or substantially step-like and that defines a cutoff wavelength $\lambda_C \leq 1200$ nm; define a mode-field diameter $MFD_{NS}$ that is: a) between 8.2 μm and 9.7 μm when the operating wavelength λ=1310 nm, and b) between 9.2 μm and 10.9 μm when the operating wavelength λ=1550 nm;
    wherein the relative refractive index profile Δ of the single-mode optical fiber has a maximum $\Delta_0$ in the range of 0.26% to 0.40%, wherein the core radius $r_0$ is in the range from 3.5 μm to 5.5 μm, and wherein the relative refractive index profile has a maximum $\Delta_0$ located in the core radius $r_0$ range from 2 μm to 3 μm;
    a first alignment member that operably supports the single-mode optical fiber, wherein the single-mode optical fiber serves as a stub fiber having a first end; and
    a single-mode field optical fiber having a second end and operably supported relative to the first alignment member by a second alignment member such that the respective first and second ends of the stub fiber and the single-mode field optical fiber are operably aligned and interfaced.

2. The optical fiber connector according to claim 1, wherein the core comprises silica glass with one or more dopants.

3. The optical fiber connector according to claim 1, further comprising a splicing member configured to operably align and interface the stub fiber and the single-mode field optical fiber.

4. The optical fiber connector according to claim 1, wherein the splicing member further comprises an interior that contains an index-matching material.

5. The optical fiber connector according to claim 1, wherein the field optical fiber meets ITU G.652 standards for long-distance transmission in telecommunications systems.

6. A optical fiber connector for use at an operating wavelength λ, comprising:
    a single-mode optical fiber that has single-mode operation at the operating wavelength λ for lengths greater than 2 meters, the single-mode optical fiber having a length L in the range from 10 mm to 20 mm over which multiple modes are supported at the operating wavelength λ, the single-mode optical fiber further a relative refractive index profile Δ that is either a substantially parabolic or substantially step-like and that defines a cutoff wavelength $\lambda_C \leq 1200$ nm and has a maximum relative refractive index $\Delta_0$ in the range from 0.26 to 0.40%, and wherein the single-mode optical fiber defines a mode-field diameter $MFD_{NS}$ that is: a) between 8.2 μm and 9.7 μm when the operating wavelength λ=1310 nm and b) between 9.2 μm and 10.9 μm when the operating wavelength λ=1550 nm;
    wherein the single-mode optical fiber has a core radius $r_0$ in the range from 3.5 μm to 5.5 μm and wherein the maximum $\Delta_0$ of the relative refractive index profile is located in the range 2 μm$\leq r_0 \leq$3 μm;
    a first alignment member that operably supports the single-mode optical fiber, wherein the single-mode optical fiber serves as a stub fiber having a first end; and
    a single-mode field optical fiber having a second end and operably supported relative to the first alignment member by a second alignment member such that the respective first and second ends of the stub fiber and the single-mode field optical fiber are operably aligned and interfaced.

7. The optical fiber connector according to claim 6, wherein the length L of the stub fiber is in the range from 15 mm to 20 mm.

8. The optical fiber connector according to claim 6, further comprising a splicing member configured to operably align and interface the stub fiber and the single-mode field optical fiber.

9. The optical fiber connector according to claim 6, wherein the splicing member further comprises an interior that contains an index-matching material.

\* \* \* \* \*